Patented Sept. 13, 1932

1,876,966

UNITED STATES PATENT OFFICE

GEORG KRÄNZLEIN, HEINRICH VOLLMANN, AND MARTIN CORELL, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

NITROGEN-CONTAINING DERIVATIVES OF DIBENZPYRENQUINONES AND PROCESS OF PREPARING THEM

No Drawing. Application filed February 25, 1929, Serial No. 342,660, and in Germany March 16, 1928.

The present invention relates to nitrogen-containing derivatives of dibenzpyrenquinones and to a process of preparing them.

We have found that new valuable dyestuffs and intermediate products are obtainable by causing a nitrating agent to react with a dibenzpyrenquinone compound of the following general formula

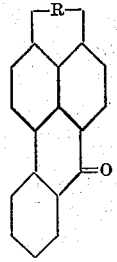

wherein R stands for the bivalent residue

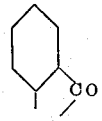

and wherein the nuclear-hydrogen atoms may be substituted or not, at least one position being unsubstituted, while stirring if necessary. The reaction generally takes place at ordinary temperature but sometimes a moderate heating of the reaction mixture, for instance 140° C., is expedient. The nitrification may also be carried out in the presence of a diluent as for instance nitrobenzene.

The nitrodibenzpyrenquinones obtainable according to the above described process may be transformed into other valuable vat dyestuffs by subjecting them to the influence of a reducing agent, such as sodium sulfide phenylhydrazine or hydrosulfite. In the latter case the reduction takes place in the alkaline vat.

According to the above described processes dibenzpyrenquinones are obtainable which contain, according to the conditions of the reaction and to the quantity of the nitrating agent used, one or several nitro or amino groups. In this manner also substituted dibenzpyrenquinones may be transformed into nitro or amino derivatives. The nitrogen-containing derivatives of dibenzpyrenquinone prepared by us are new compounds of the following formula:

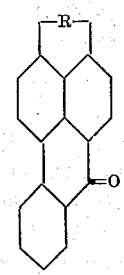

wherein R stands for the bivalent residue

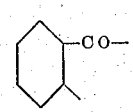

which contain one or more nitro or amino groups and may contain furthermore an alkyl group or halogen.

The following examples serve to illustrate our invention but they are not intended to limit it thereto, the parts being by weight.

(1) 100 parts of 3.4.8.9-dibenzpyrenquinone are introduced at ordinary temperature, while stirring, into 500 parts of nitric acid (specific gravity 1.5). The product first dissolves and then separates again in a crystalline form as a nitro derivative. Stirring is continued at 50° C. for about a quarter of an hour, the product is filtered by suction and washed until neutral. The so-formed dinitro derivative is very sparingly soluble in organic solvents. It crystallizes from a large quantity of boiling nitrobenzene in the form of yellow flat needles dissolving in concentrated sulfuric acid to a pure red solution. By treating it with an alkali and hydrosulfite it is first reduced to the amino derivative which is finally transformed into a carmine red vat with a violet separation on its surface by access of air from which vat cotton is dyed violet tints. The position of the two nitro groups could not yet be definitely ascertained.

(2) 50 parts of 3.4.8.9-dibenzpyrenquinone are introduced in a finely sub-divided form at ordinary temperature into a mixed sulfuric-nitric acid containing 30 per cent of $HNO_3$ and the mass is stirred for some time at ordinary or at slightly elevated temperature. The product is finally given on water and isolated in the usual manner. The product thus obtained has almost the same properties as that described in the preceding example; it may for instance be transformed into a dark-violet amino derivative by boiling it with a solution of sodium sulfide of 15 per cent.

(3) By stirring 100 parts of dibromo-3.4.8.9-dibenzpyrenquinone (obtainable according to Example 2 of German patent specification No. 430,556) with 500 parts of concentrated nitric acid at about 80° C. for half an hour a crystallized nitrodibromdibenzpyrenquinone is obtained which is as regards its properties very similar to the not brominated nitro derivative. The position of the substituents could not yet be definitely ascertained.

(4) 30 parts of 4.5.8.9-dibenzpyrenquinone-3.10 are treated with 225 parts of concentrated nitric acid in a ball mill at 20° C.–50° C. for one hour. The mixture is diluted with water and the product separating in a crystalline form is filtered by suction. It crystallizes from nitrobenzene in orange glittering needles and shows the nitrogen content calculated for a dinitro derivative. The product dissolves in concentrated sulfuric acid to a bluish-green solution.

By reduction effected for instance by heating the product with phenylhydrazine, the diamino derivative is obtained crystallizing in the form of steel-blue needles; it dissolves in concentrated sulfuric acid to a pure green solution and dyes cotton from an orange vat grayish-blue tints. By subsequently treating the dyed material with a hypochlorite deep dark-brown tints are obtained.

(5) 20 parts of monomethyl-4.5.8.9-dibenzpyrenquinone (obtainable by subjecting 2—[p—toluyl—] benzanthrone to the action of aluminum chloride so that ring closure is effected) are mixed first at ordinary temperature, while stirring, with 150 parts of concentrated nitric acid. The nitro-product which first separates is dissolved by heating the mass and remains in solution also after the solution has been allowed to cool. The solution is poured into water and the product which has separated in the form of yellow flakes is isolated. It dissolves in concentrated sulfuric acid to a brownish-red solution and forms after it has been reduced an orange-red hydrosulfite vat from which cotton is dyed olive-green tints.

(6) 25 parts of 4.5.8.9-dibenzpyren-3.10-quinone are treated in a ball mill with 200–300 parts of a mixture of nitric acid (specific gravity 1.5) and nitrobenzene in the proportion of 1:4 at ordinary temperature for 12 hours. After the mass has been filtered and washed with alcohol a mononitrodibenzpyrenquinone is obtained which crystallizes from nitrobenzene in orange-red needles. It dissolves in concentrated sulfuric acid to a yellowish-green solution. By reducing the product preparatory to dyeing the monoamino derivative is obtained forming a vat with a violet separation on its surface by access of air.

The same mononitro derivative can also be obtained by treating 4.5.8.9-dibenzpyrenquinone with the calculated quantity of nitric acid in nitrobenzene at an elevated temperature.

(7) 10 parts of 3.4.8.9-dibenzpyrenquinone-5.10 are suspended in 120 parts of nitrobenzene and afterwards 10 parts of nitric acid (specific gravity 1.5) are introduced drop by drop while stirring. The mass is heated to a temperature of from 130° C. to 135° C. for about 5 minutes, then it is allowed to cool to 80° C.–100° C., and finally the mononitrodibenzpyrenquinone which has separated is filtered by suction. The product forms orange needles which dissolve in concentrated sulfuric acid to a bluish-red solution.

(8) By stirring a mixture of 4.5.8.9-dibenzpyren-3.10-quinone and nitric acid as indicated in Example 4 with the difference of stirring being continued for several hours, the nitro derivative which has first been separated gradually redissolves. By precipitating the solution with water or glacial acetic acid a light-yellow nitro derivative is obtained which crystallizes from nitrobenzene in the form of yellow flat needles and whose nitrogen content corresponds to that calculated for a trinitro derivative. At ordinary temperature the said trinitro derivative sparingly dissolves in concentrated sulfuric acid to a reddish-brown solution.

By treating 3.4.8.9-dibenzpyren-5.10-quinone in an analogous manner a more highly-nitrated derivative is obtained.

(9) 20 parts of 3.4.8.9-dibenzpyren-5.10-quinone are suspended in 400 parts of nitrobenzene and 120 parts of nitric acid of 1.5 specific gravity are run into this suspension at 130° C. After one hour's stirring at a temperature of from 130° C. to 150° C. the nitro derivative is filtered hot by suction and washed. The product which crystallizes in the form of yellowish-orange needles is identical with that obtained according to Example 1.

We claim:

1. The process which comprises causing a nitrating agent to react with a compound of the general structure:

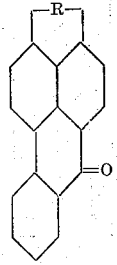

wherein R stands for the bivalent residue

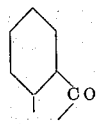

and at least one nuclear hydrogen atom is unsubstituted.

2. The process which comprises subjecting a compound of the general structure:

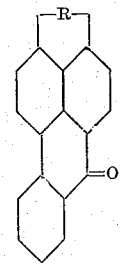

wherein R stands for the bivalent residue

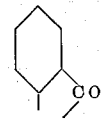

and at least one nuclear hydrogen atom is unsubstituted, to the action of nitric acid.

3. The process which comprises subjecting a compound of the following formula:

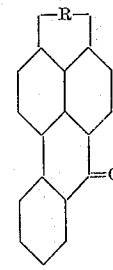

wherein R stands for the bivalent residue

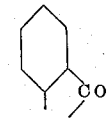

and wherein the nuclear-hydrogen atoms are not substituted to the action of nitric acid.

4. As new substances, compounds of the following formula:

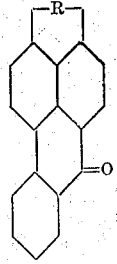

wherein R stands for the bivalent residue

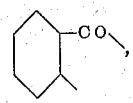

which contains one or several nitro or amino groups and which may furthermore contain an alkyl group or halogen.

5. As new substances, compounds of the following formula:

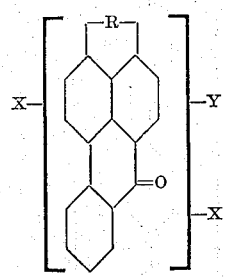

wherein R stands for the bivalent residue

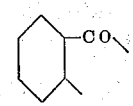

Y for the $NO_2$ group or the $NH_2$ group and X for hydrogen, the $NO_2$ or the $NH_2$ group, for an alkyl or halogen.

6. As new substances, compounds of the following formula:

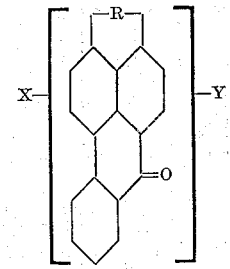

wherein R stands for the bivalent residue

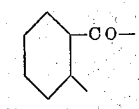

Y for the $NO_2$ group or the $NH_2$ group and X for hydrogen, the $NO_2$ or the $NH_2$ group, for an alkyl or halogen.

7. As new substances, compounds of the following formula:

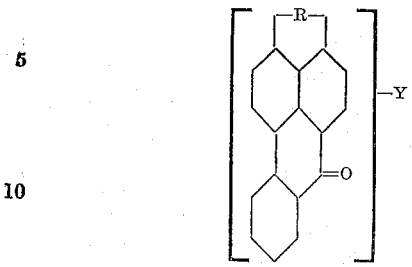

wherein R stands for the bivalent residue

and Y for the $NO_2$ or the $NH_2$ group.

8. As a new substance, the compound of the following formula:

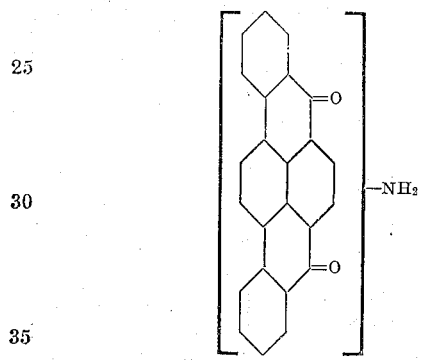

9. As a new substance, a compound of the following formula:

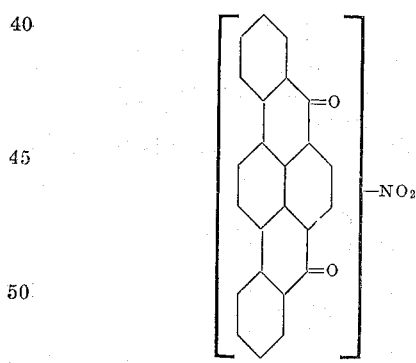

this mono-nitro-iso-dibenzpyrenquinone crystallizing from nitrobenzene in orange-red needles and dissolving in concentrated sulfuric acid to a yellowish-green solution.

10. The process which comprises subjecting 4.5.8.9-dibenzpyren-3.10-quinone to the action of nitric acid.

11. The process which comprises subjecting 4.5.8.9-dibenzpyren-3.10-quinone to the action of concentrated nitric acid at a temperature of about 20° C. to 50° C. for about one hour while stirring.

12. As a new product, the compound of the following formula:

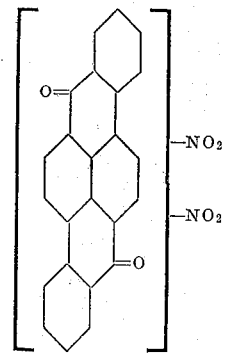

crystallizing from nitrobenzene in the form of yellow needles dissolving in concentrated sulfuric acid to a pure red solution.

In testimony whereof, we affix our signatures.

GEORG KRÄNZLEIN.
HEINRICH VOLLMANN.
MARTIN CORELL.